(12) United States Patent
Lowery et al.

(10) Patent No.: US 8,111,993 B2
(45) Date of Patent: Feb. 7, 2012

(54) METHODS AND APPARATUS FOR OPTICAL TRANSMISSION OF DIGITAL SIGNALS

(75) Inventors: Arthur James Lowery, Kew (AU); Jean Armstrong, North Balwyn (AU)

(73) Assignee: Ofidium Pty Ltd., Melbourne (AU)

( * ) Notice: Subject to any disclaimer, the term of this patent is extended or adjusted under 35 U.S.C. 154(b) by 314 days.

(21) Appl. No.: 12/089,571

(22) PCT Filed: Oct. 12, 2006

(86) PCT No.: PCT/AU2006/001511
§ 371 (c)(1),
(2), (4) Date: Aug. 15, 2008

(87) PCT Pub. No.: WO2007/041799
PCT Pub. Date: Apr. 19, 2007

(65) Prior Publication Data
US 2009/0169213 A1    Jul. 2, 2009

(30) Foreign Application Priority Data
Oct. 12, 2005 (AU) ................................ 2005905688

(51) Int. Cl.
*H04J 14/02* (2006.01)
*H04J 1/00* (2006.01)

(52) U.S. Cl. .............. 398/81; 398/76; 398/79; 398/147; 398/158; 398/159; 398/208

(58) Field of Classification Search ............ 398/79, 398/89, 99, 163, 183, 182, 185, 187, 208; 375/260, 316
See application file for complete search history.

(56) References Cited

U.S. PATENT DOCUMENTS
6,469,649 B1 * 10/2002 Helkey et al. ................ 341/155
(Continued)

FOREIGN PATENT DOCUMENTS
EP 0466182 B1 10/2002
(Continued)

OTHER PUBLICATIONS

Dixon et al., "Orthogonal Frequency-Division multiplexing in wireless Communications Systems with Multimode Fiber Feeds", Trans Microwave Theory and Techniques, 49(8), Aug. 8, 2001, 6 pages.

(Continued)

*Primary Examiner* — Li Liu
(74) *Attorney, Agent, or Firm* — Woodcock Washburn LLP

(57) ABSTRACT

A system (100) for transmitting digital information includes a transmitting apparatus (102) for generating an optical signal bearing digital information, a dispersive optical channel (104), and a receiving apparatus (110) for receiving the optical signal. The dispersive optical channel (104) is disposed to convey the optical signal from the transmitting apparatus (102) to the receiving apparatus (110). The transmitting apparatus includes an encoder (114) for encoding digital information into a series of blocks, each including a plurality of data symbols corresponding with one or more bits of digital information. A signal generator (118) generates a time-varying signal corresponding with each of said blocks. An optical transmitter (136) is arranged to apply the time-varying signal to an optical source (138) to produce an optical signal which includes an optical carrier and substantially only a single information bearing optical sideband in an optical frequency domain, the sideband corresponding with the time-varying signal. The receiving apparatus (110) includes an optical detector (146) for detecting the optical signal to produce a corresponding received time-varying electrical signal. The receiver further includes means (166) for generating a series of received data blocks from the time-varying electrical signal. An equalizer (168) performs an equalization of received data symbols included in each data block to mitigate the effect of dispersion of the optical channel, thereby enabling the transmitted data symbols to be recovered.

18 Claims, 10 Drawing Sheets

U.S. PATENT DOCUMENTS

| | | | |
|---|---|---|---|
| 6,504,636 B1* | 1/2003 | Seto et al. | 398/91 |
| 6,559,994 B1* | 5/2003 | Chen et al. | 398/182 |
| 6,661,976 B1* | 12/2003 | Gnauck et al. | 398/183 |
| 2002/0030877 A1* | 3/2002 | Way et al. | 359/183 |
| 2002/0041637 A1* | 4/2002 | Smart et al. | 375/316 |
| 2003/0138181 A1 | 7/2003 | Davies | |
| 2004/0052535 A1* | 3/2004 | Nohara et al. | 398/189 |
| 2005/0063035 A1 | 3/2005 | Mitchell et al. | |
| 2005/0074037 A1* | 4/2005 | Rickard et al. | 370/537 |
| 2005/0175112 A1* | 8/2005 | Pisoni et al. | 375/260 |
| 2005/0180760 A1* | 8/2005 | Feced et al. | 398/183 |
| 2005/0231783 A1* | 10/2005 | Panzeri | 359/237 |
| 2009/0067833 A1 | 3/2009 | Bunge et al. | |
| 2009/0074415 A1 | 3/2009 | Xie | |
| 2009/0290877 A1 | 11/2009 | Yu et al. | |
| 2009/0290878 A1 | 11/2009 | Yu et al. | |
| 2010/0086303 A1 | 4/2010 | Qian et al. | |
| 2010/0135656 A1 | 6/2010 | Khurgin et al. | |
| 2010/0142637 A1 | 6/2010 | Hu et al. | |

FOREIGN PATENT DOCUMENTS

| | | | |
|---|---|---|---|
| EP | 2061198 A1 | 5/2009 | |
| EP | 2066044 A1 | 6/2009 | |
| EP | 2071754 A1 | 6/2009 | |
| EP | 2073474 A1 | 6/2009 | |
| JP | 2005311722 A | 11/2005 | |
| KR | 2010068388 A | 6/2010 | |
| WO | 2002/061986 A2 | 8/2002 | |
| WO | WO 02061986 | * | 8/2002 |
| WO | WO 2010/073990 A | 7/2010 | |

OTHER PUBLICATIONS

Giacoumidis et al., "Adaptive-Modulation-enabled WDM Impairment reduction in Multichannel Optical OFDM Transmission Systems for next-generation PONs", IEEE Photonics Journal, 2(2), Apr. 2010, 12 pages.

Giddings et al., "Colourless real-time Optical OFDM end-to-end Transmission at 7.5 Gb/s over 25 km SSMF using 1 GHz RSOAs fro WDM-PONs", OFC/NFOEC 2010, 978-1-55752-884-1/10 ©2010, School of Electronic Engineering Bangor University, 3 pages.

Jin, "Real-Time Demonstration of 128-QAM encoded Optical OFDM Transmission with a 5.25 bit/s/Hz Spectral efficiency in Simple IMDD Systems Utilizing Directly Modulated DFB Lasers", Optics Express, 17(22), Oct. 26, 2009, 10 pages.

Jolley et al., "Generation and Propagation of a 1550 nm 10 Gbits/s Optical Orthogonal Frequency Division Multiplexed Signal over 1000 m of multimode fibre using a directly modulated DFB", Optical Fibre Communications Conference, Mar. 6-10, 2005, 3 pages.

Meslener, "Chromatic Dispersion induced Distortion of Modulated Monochromatic Light employing direct Detection", Journal of Quantum Electronics, QE-20(10), Oct. 1984, 9 pages.

Schuster et al., "Spectrally Efficient Compatible Single-Sideband Modulation for OFDM Transmission with Direct Detection", Phonics Technology Letters, 20(9), May 1, 2008, 3 pages.

Tang et al., "30 Gb/s Signal Transmission over 40-km directly Modulated DFB-laser based single-mode-fiber links without Optical Amplification and dispersion Compensation", Journal of Lightwave Technology, 24(6), Jun. 2006, 10 pages.

Tang et al., "Maximizing the Transmission Performance of Adaptively Modulated Optical OFDM Signals in Multimode fiber links by Optimizing Analog-to-Digital Converters", Journal of Lightwave Technology, 25(3), Mar. 2007, 12 pages.

Wei et al., "The Influence of Directly modulated DFB lasers on the Transmission Performance of Carrier-Suppressed Single Sideband Optical OFDM Signals over IMDD SMF Systems", Journal of Lightwave Technology, 27(13), Jul. 1, 2009, 8 pages.

* cited by examiner

METHODS AND APPARATUS FOR OPTICAL TRANSMISSION OF DIGITAL SIGNALS

CROSS REFERENCE TO RELATED APPLICATIONS

This application is the national phase of PCT Application No. PCT/AU2006/001511, filed Oct. 12, 2006, which claims priority to Australian Application No. 2005905688, filed Oct. 12, 2005.

FIELD OF THE INVENTION

The present invention relates generally to optical communications, and more particularly to methods and apparatus for generation of optical signals for transmission over long distances via optical channels, and especially optical fibres, which exhibit high levels of total chromatic dispersion.

BACKGROUND OF THE INVENTION

Optical transmission, in which an information signal is modulated onto an optical carrier, is widely employed in modern communications systems. In particular, wide area communications networks employ long-haul transmission links using single mode optical fibres for the transmission of digital information at very high bit rates, using one or more optical carriers, or wavelengths, over each fibre. The distances over which data may be transmitted in single-mode optical fibres before some form of regeneration is required is limited by optical attenuation and pulse dispersion. The advent of practical optical amplifiers has substantially eliminated the loss limitation, particularly for systems operating in the third optical communications window at wavelengths around 1550 nm, in which erbium-doped fibre amplifiers are applicable. However, dispersion processes, including chromatic dispersion and polarisation mode dispersion (PMD), which lead to pulse broadening, remain a significant cause of distortion in such systems, which if not managed or compensated can severely limit the reach of optical transmission spans.

The problem presented by chromatic dispersion increases rapidly as the bit rate of optical data channels is increased. This is because, on the one hand, increasing the bit rate results in an increase in the spectral width of transmitted channels, and hence increased pulse broadening as a result of chromatic dispersion. On the other hand, increasing the bit rate also results in a reduction in the bit period ie the time interval between consecutive bits. In wavelength division multiplexed digital transmission systems in particular, it is not practical to reduce pulse broadening by employing optical fibre having a low or zero dispersion value near the transmission wavelength, because a low first order dispersion value is associated with increased distortion due to non-linear processes.

The impact of PMD also increases at higher data rates, again due to the reduced bit period, and to some extent also due to spectral broadening, particularly when higher-order PMD processes are considered.

Accordingly, methods and apparatus that are able to compensate for the effects of dispersion within optical fibre transmission spans have taken on increasing importance in high capacity optical transmission systems.

Known methods of compensating for the effect of chromatic dispersion include pre-chirping of transmission lasers, mid-span optical phase conjugation of data channels, the use of chirped-fibre Bragg gratings having dispersion characteristics opposed to those of the optical fibre transmission span, and the use of highly dispersive dispersion compensating fibre.

However, these methods are not without their drawbacks. In particular, all operate substantially within the optical domain, and typically use components providing a fixed amount of dispersion compensation. Accordingly, these components must be designed and/or configured to match the characteristics of the specific transmission spans in which they are installed, and they are not readily dynamically adaptable for use in different transmission spans, or in systems exhibiting varying total chromatic dispersion.

On the other hand, it is relatively straightforward to design and construct electronic systems, including analogue and/or digital systems, that may include software components, and that are highly adaptive to changing requirements. In particular, adaptive electronics have been extensively applied in radio frequency (RF) communications systems, including both wireless and wireline systems which are able to dynamically compensate or equalise channel characteristics. There has therefore been interest in recent times in devising methods and apparatus enabling more sophisticated electronic processing techniques to be used to mitigate the effects of dispersion in optical transmission spans. Electronic dispersion compensation may be used, for example, to upgrade existing transmission links without replacing or augmenting installed optical plant. Furthermore, electronic dispersion compensators could be designed to adaptively respond to dynamic changes in total dispersion, such as may occur in systems employing all optical switching and transmission technologies.

A significant obstacle to the implementation of electronic dispersion compensation within optical transmission systems is that most high-bandwidth optical systems employ intensity modulation at the transmitter, in combination with direct detection at the receiver. Intensity modulation results in optical signals having two frequency sidebands disposed about a central optical carrier frequency, and direct detection of such signals results in a loss of the optical phase information which is required to enable the effects of dispersion generally, and chromatic dispersion in particular, to be compensated. Accordingly, methods of performing electronic dispersion compensation at the receiving end have been proposed which involve the transmission of signals that do not have the conventional double-side band frequency spectrum which results from intensity modulation. In particular, electronic dispersion compensation methods using optical single sideband (OSSB) or vestigial sideband (VSB) have been proposed, in which the optical phase information is translated directly into electrical phase information at the optical receiver. Additionally, it has been proposed to generate such signals in which a number of RF sub-carriers are multiplexed within the transmitted single optical sideband. Because each such sub-carrier may have a significantly narrower bandwidth than the overall bandwidth of the transmitted optical signal, an increased tolerance to dispersion may be achieved.

However, previously proposed electronic dispersion compensation techniques based on the use of OSSB transmission and/or RF sub-carrier multiplexing suffer from a number of remaining limitations. Firstly, the quality and cost of the RF components, including RF filters, mixers and so forth, limit the number of RF sub-carriers that may be employed, and the spectral efficiency of the sub-carrier multiplexing. Furthermore, similar limitations and/or costs are imposed at the receiver, where the RF sub-carriers must be demultiplexed and compensated, or equalised, independently. Additionally, the systems proposed to date have exhibited comparatively poor optical power efficiency.

There is therefore an ongoing need for improved methods and apparatus for the generation and transmission of optical signals which enable effective dispersion compensation to be performed in the electronic domain, while mitigating the aforementioned disadvantages of known methods and systems.

SUMMARY OF THE INVENTION

In one aspect, the invention provides a method of communicating digital information over a dispersive optical channel, the method including the steps of:

encoding the digital information into a series of blocks, each block including a plurality of transmitted data symbols corresponding with one or more bits of said digital information;

generating a transmitted time-varying signal corresponding with each of said blocks;

applying the transmitted time-varying signal to an optical source to produce a transmitted optical signal which includes an optical carrier and substantially only a single information bearing optical sideband in an optical frequency domain, wherein the sideband corresponds with the transmitted time-varying signal;

transmitting the optical signal over the optical channel;

detecting the optical signal to produce a corresponding received time-varying electrical signal;

generating a series of received data blocks from said time-varying electrical signal; and performing a frequency domain equalisation of received data symbols included in each of said received data blocks to mitigate the effect of chromatic dispersion of the optical channel, thereby to recover the transmitted data symbols.

Accordingly, the method provides a transmitted optical signal having substantially only a single optical sideband, and which thereby enables the optical phase information to be preserved in an electrical signal generated at a corresponding optical detector, such that electronic dispersion compensation may be performed at a receiver. Furthermore, the use of block coding to generate the transmitted signal in combination with frequency domain equalisation techniques at a receiver, obviates the need for separate RF components at the transmitting or receiving ends to process signals carried on individual RF sub-carriers. The method is therefore highly scalable, providing high spectral efficiency, improved tolerance to dispersion, and simplified equalisation, or compensation, of the effects of chromatic dispersion in particular, without a corresponding scaling in the cost and/or complexity of apparatus at the transmitting or receiving ends.

In another aspect, the invention provides a method of receiving digital information transmitted over a dispersive optical channel having a chromatic dispersion characteristic, wherein the digital information is borne by an optical signal which includes an optical carrier and substantially only a single information-bearing optical sideband in an optical frequency domain, said optical sideband corresponding with a transmitted time-varying signal generated from a series of transmitted data blocks, each of which includes a plurality of transmitted data symbols corresponding with one or more bits of the digital information, the method including the steps of:

detecting the optical signal to produce a corresponding received time-varying electrical signal;

generating a series of received data blocks from said time-varying electrical signal; and performing a frequency domain equalisation of received data symbols included in each of said received data blocks to mitigate the effect of chromatic dispersion of the optical channel, thereby to recover the transmitted data symbols.

According to preferred embodiments the transmitted time-varying signal is generated from each block using a frequency/time transform. The series of received data blocks may then be generated using a corresponding time/frequency (inverse) transform.

In preferred embodiments, the steps of encoding and generating a transmitted time-varying signal are performed in accordance with an orthogonal frequency division multiplexing (OFDM) method. Accordingly, the step of generating the transmitted time-varying signal preferably includes computing the frequency/time transformation using an inverse discrete Fourier transform (IDFT) of the data symbols in each data block. Advantageously, the IDFT may be computed using a fast Fourier transform (FFT) algorithm.

The data symbols may be, for example, real or complex values generated in accordance with a desired mapping between the digital information bits and symbol values. Suitable mapping methods may correspond with conventional signal modulation formats, and may include, but are not limited to, on-off keying (OOK), amplitude shift keying (ASK), quadrature amplitude modulation (QAM), phase-shift keying (PSK), frequency shift keying (FSK) and so forth.

Preferably, discrete digital values generated by the frequency/time transformation are converted from parallel to serial format, and digital to analogue conversion is used to generate a real, time-varying, electrical signal which may be applied to produce the optical signal.

The step of generating the time-varying signal may also include the addition of a guard band or a cyclic prefix, which advantageously assists in equalisation of the detected optical signal at the receiver.

The step of applying the time-varying signal to the optical source preferably includes applying an optical modulation corresponding with the transmitted time-varying signal. Preferably, the optical source is a coherent source, for example a laser source such as a semiconductor laser diode.

The step of applying the transmitted time-varying signal may also include optically filtering the modulated optical source to at least substantially suppress one optical frequency sideband, thereby producing an optical signal which includes substantially only a single information-bearing optical sideband in the optical frequency domain, wherein the sideband corresponds with the transmitted time-varying signal.

The filtered optical signal may be combined with a portion of an unmodulated output of the optical source in order to provide the optical carrier of the transmitted optical signal. Alternatively, filtering may be performed so as to retain at least a portion of the optical carrier present in the modulated signal.

The modulation applied to the optical source is preferably an intensity modulation or a phase modulation.

It will be appreciated that while preferred embodiments of the invention employ successive stages of modulation and optical filtering, alternative methods for direct generation of a suitable OSSB optical signal may be utilised, such as known methods using, for example, multi-electrode modulators with appropriate electrical driving signals derived from the transmitted time-varying signal.

It is preferred that the power in the optical carrier and/or the optical sideband be controlled or adjusted to achieve therebetween a desired division of the total energy in the optical signal. Such control or adjustment is particularly advantageous, because it enables the power efficiency of the transmitted optical signal to be substantially improved over that achieved in known methods. The ratio between the energy in the optical carrier and that in the optical sideband may be, for example, between 0.5 and 2.0, and in particular it may be desirable that the energy in the optical carrier and the optical sideband is approximately equal. In general it has been found that for any given transmitted signal an optimum carrier power exists, which maximises received signal quality, and which is dependent upon parameters such as the modulation format and modulation depth. In preferred embodiments, the optimum carrier power may be substantially provided by appropriate suppression of the carrier output from an optical modulator.

In a particularly preferred embodiment, the time-varying signal is applied to the optical source such that a frequency guard band is provided between the optical carrier and the information-bearing optical sideband. It is especially preferred that a frequency guard band is provided having a bandwidth that is equal to or greater than the bandwidth occupied by the information-bearing sideband. In this arrangement, a specific advantage is achieved in that distortion products which may be generated in an optical detector due to mixing between components of the information-bearing optical sideband fall substantially outside the received signal bandwidth, and substantially within the frequency guard band, such that interference and/or distortion of the received signal is significantly reduced.

It will be appreciated that a variety of methods are available to the skilled person to generate a signal having a frequency guard band, including methods performed in the digital, electronic (RF) and/or optical domains.

The step of transmitting the optical signal generally includes transmission through single-mode optical fibre, and such transmission may be over long distances, for example exceeding 1,000 kilometers. Indeed, with appropriate selection of the parameters of the inventive method, transmission of optical signals over distances on the order of 1,000,000 kilometers may be possible. The transmission channel may include optical amplifiers to compensate for loss or attenuation of the single-mode optical fibres.

The step of detecting the optical signal preferably includes performing optical to electronic conversion, for example using a detector such as a photodiode, avalanche photodiode (APD), or the like, along with electrical amplification as required.

The step of generating a series of received data blocks preferably includes sampling the received time-varying electrical signal to produce a sequence of discrete digital values. In preferred embodiments, the discrete digital values are transformed using a time/frequency transformation, which corresponds with a frequency/time transform used in the generation of the transmitted time-varying signal. In a preferred embodiment, a discrete Fourier transform (DFT) of the sampled signal is performed, advantageously using an FFT algorithm, in order to compute a series of received symbol values.

The step of performing an equalisation of received data symbols then preferably includes performing at least a phase adjustment of each received symbol value in order to substantially equalise the effect of the chromatic dispersion of the optical channel on the transmitted optical signal, such that the received and equalised symbol values more closely approximate the transmitted symbol values. The equalisation may also include performing an amplitude adjustment of each received symbol value.

Advantageously, the method may include the further step of recovering the original information bits from the equalised received symbol values. It is particularly preferred that a demapping method is used to recover the original information bits, that corresponds with the mapping applied in the encoding step. As previously described, suitable mapping and demapping methods correspond with conventional signal modulation formats, including OOK, ASK, QAM, PSK, FSK and so forth.

In still another aspect, the invention provides an apparatus for receiving digital information transmitted over a dispersive optical channel, wherein the digital information is borne by an optical signal which includes an optical carrier and substantially only a single information-bearing optical sideband in an optical frequency domain, said optical sideband corresponding with a transmitted time-varying signal generated from a series of transmitted data blocks, each of which includes a plurality of transmitted data symbols corresponding with one or more bits of the digital information, the receiving apparatus including:

an optical detector for detecting the optical signal to produce a corresponding received time-varying electrical signal;

means for generating a series of received data blocks from said time-varying electrical signal; and an equaliser for performing a frequency domain equalisation of received data symbols included in each of said received data blocks to mitigate the effect of dispersion of the optical channel, thereby to recover the transmitted data symbols.

In another aspect, the invention provides a system for transmitting digital information, including:

a transmitting apparatus for generating an optical signal bearing digital information, the transmitting apparatus including:
  an encoder for encoding the digital information into a series of blocks, each block including a plurality of data symbols corresponding with one or more bits of said digital information;
  a signal generator for generating a time-varying signal corresponding with each of said blocks; and
  an optical transmitter arranged to apply the time-varying signal to an optical source to produce an optical signal which includes an optical carrier and substantially only a single information-bearing optical sideband in an optical frequency domain, wherein the sideband corresponds with the time-varying signal;

a receiving apparatus for receiving the optical signal bearing the digital information, the receiving apparatus including:
  an optical detector for detecting the optical signal to produce a corresponding received time-varying electrical signal;
  means for generating a series of received data blocks from said time-varying electrical signal; and
  an equaliser for performing a frequency domain equalisation of received data symbols included in each of said received data blocks,
thereby to recover the data symbols transmitted by the transmitting apparatus; and a dispersive optical channel disposed to convey the optical signal from the transmitting apparatus to the receiving apparatus.

In a preferred embodiment, the encoder includes a plurality of mapping units for receiving bits of the digital information, and generating a corresponding plurality of symbol values. The mapping units may implement any one or more of a number of appropriate mapping methods, including mappings corresponding with conventional modulation formats such as OOK, ASK, QAM, PSK, FSK and so forth. In preferred embodiments, the mapping units may be implemented using digital hardware and/or software means, as well known in the art of digital signal processing.

The signal generator may include a frequency/time transformer, preferably incorporating digital hardware and/or software means for implementing a frequency/time transform to produce a digital time domain signal. In a particularly preferred embodiment, the frequency/time transformer implements an IDFT, preferably using an FFT algorithm. The signal generator may further include at least one parallel-to-serial converter for generating a time sequence of digital samples from the output of the transformer, and at least one corresponding digital-to-analog converter (DAC) for generating a continuously time-varying electrical signal. In preferred embodiments, the signal generator is further configured to insert a guard time and/or a cyclic prefix into the time-varying signal, to assist in the equalisation of the received signal in the frequency domain at a corresponding receiver.

The optical source of the optical transmitter is preferably a coherent optical source, for example a laser source such as a semiconductor laser diode. The optical transmitter may further include electrical driving circuitry for directly modulating the optical source, or preferably may include an external optical modulator, such as a Mach-Zehnder or electro-absorption type intensity modulator, an optical phase modulator, or the like.

The optical transmitter may further include an optical filter to at least substantially suppress one optical frequency sideband of a modulated signal output from the modulated optical source. Advantageously, the output of the optical filter thereby includes an optical signal having substantially only a single information-bearing optical sideband in the optical frequency domain. The optical transmitter may further include optical components for extracting a portion of an unmodulated output of the optical source, and for combining this with the modulator output in order to provide the optical carrier of the optical signal.

In alternative embodiments, the optical transmitter may include an optical filter arranged to retain at least a portion of the optical carrier present in the modulated signal, such that the output of the optical filter is an optical signal including an optical carrier and substantially only a single information-bearing optical sideband.

It will, however, be appreciated by those skilled in the art that alternative optical transmitter arrangements are possible, including arrangements providing for the direct generation of OSSB optical signals using, for example, a multi-electrode optical modulator with appropriate driving electronics for driving each electrode with signals derived from the time-varying signal.

In preferred embodiments, the optical detector includes a suitable device for optical to electronic conversion of the optical signal, such as a photodiode, avalanche photodiode (APD) or the like. The optical detector may further include electronic devices, such as amplifiers, filters and so forth, for adjusting the signal level and conditioning the received signal.

The means for generating received data blocks preferably includes an analog-to-digital converter (ADC) for sampling the detected signal and generating a digitised time sequence representative of the signal.

The generating means may further include digital hardware and/or software means for performing a serial-to-parallel conversion of the sampled data. Additionally, in preferred embodiments the generating means includes hardware and/or software means for computing a time/frequency transformation, which is most preferably a DFT, implemented, for example, using an FFT algorithm. According to preferred embodiments, the output of said transform is a plurality of received data symbols, arranged into received data blocks.

The equaliser preferably includes an equaliser bank, including a plurality of filters for adjusting at least the phase of each received data symbol value in order to substantially equalise the effect of the chromatic dispersion of the optical channel. The equaliser bank may also adjust the amplitude of each received data symbol. Preferably, the receiving apparatus further includes a plurality of demapping units for receiving the equalised symbol values, and generating corresponding bits of the digital information. As will be appreciated, the demapping units may correspond with mapping units employed in a corresponding transmitter, and accordingly may implement any appropriate demapping method, such as demapping corresponding with conventional modulation formats including OOK, ASK, QAM, PSK, FSK and so forth. In preferred embodiments, the demapping units may be implemented using digital hardware and/or software means, as well known in the art of digital signal processing.

The optical channel is preferably a single mode optical fibre.

Further preferred features and advantages of the invention will be apparent to those skilled in the art from the following description of preferred embodiments of the invention, which should not be considered to be limiting of the scope of the invention as defined in the preceding statements, or in the claims appended hereto.

BRIEF DESCRIPTION OF THE DRAWINGS

Preferred embodiments of the invention are described with reference to the accompanying drawings, in which.

DETAILED DESCRIPTION OF PREFERRED EMBODIMENTS

Figure 1:
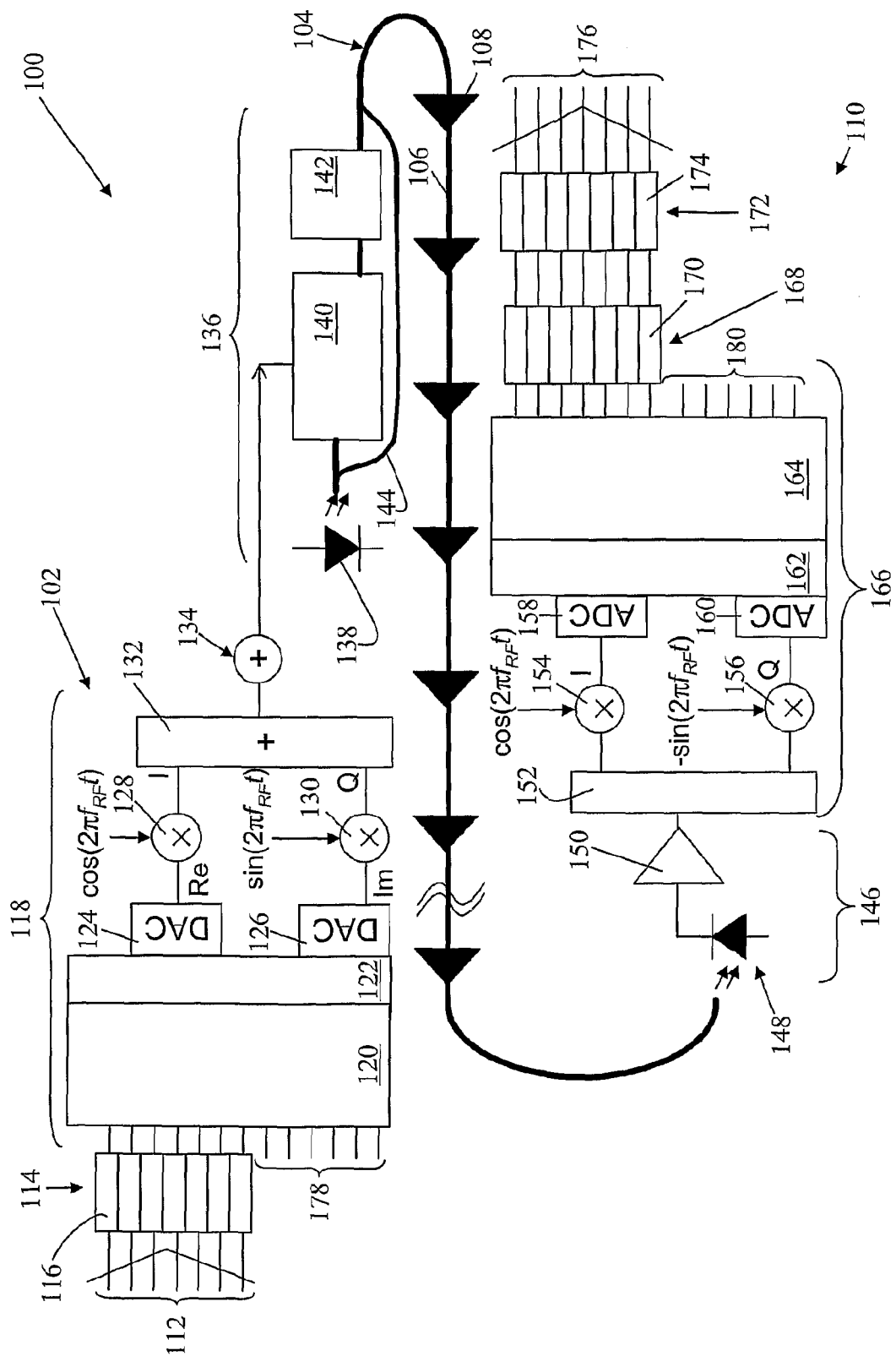
FIG. 1 illustrates schematically a system for communicating digital information over a long span of dispersive single-mode fibre according to an embodiment of the invention.

Turning first to FIG. 1, there is shown schematically a system 100 for communicating digital information over a long span of dispersive single-mode fibre according to an embodiment of the present invention.

The exemplary system 100 includes apparatus 102 for generating an optical signal bearing digital information for transmission over amplified single-mode fibre span 104. The transmission span 104 may generally include a plurality of individual single-mode fibre sections, eg 106, with loss-compensating amplifiers, eg 108, inserted therebetween to overcome losses in signal power resulting from the attenuation of the single-mode fibre links.

The system 100 also includes receiving apparatus 110 for receiving the digital information transmitted from transmitting apparatus 102 over fibre span 104.

Digital information for transmission over fibre span 104 is input to the transmitter 102 via the parallel input port 112. The input digital information is processed within transmitter 102 in blocks, each block including a number of bits of information corresponding with the parallel inputs of input port 112. It will be appreciated that other forms of input for digital information, such as a serial input port, may alternatively be provided. The number of bits of information included in each block is typically predetermined, and in any particular embodiment may be a fixed number of bits, or may change over time in accordance with various factors, such as desired information bit rate and/or other system parameters.

An encoder 114 includes a plurality of mapping units, eg 116, for generating a corresponding plurality of data symbols, each of which is generally a complex value encoding one or more of the input information bits 112. According to a preferred embodiment of the system 100, a QAM mapping is used by the mapping units 116 to encode the input data bits in order to provide the resulting encoded data symbol values. Each QAM signal value is a complex number representing the amplitude and phase modulation to be applied to a corresponding frequency carrier of the transmitted signal. It will be appreciated, however, that alternative mapping schemes may be used for encoding of the input data, including, but not limited to, OOK, ASK, PSK, FSK and so forth.

The transmitter 102 further includes a signal generator 118, which generates a time-varying signal corresponding with each of the encoded data symbol blocks. According to the exemplary embodiment of the system 100, an OFDM method is used for generating the time-varying signal. A frequency/time transformer 120, which is preferably implemented using an inverse-discrete Fourier transform (IDFT) employing an FFT algorithm, generates a block of transformed values which are input to parallel-to-serial converter 122. As will be appreciated, the IDFT may readily be implemented using either digital electronic hardware or software means, or a combination of hardware and software, as well known in the art.

In general, the parallel output of frequency/time transformer 120, and hence parallel-to-serial converter 122, is a sequence of complex values including real and imaginary components. In accordance with the exemplary embodiment of the system 100 the real and imaginary components are divided into two separate output streams, each of which is converted into a respective continuously time-varying electrical signal by digital-to-analog converters (DACs) 124, 126. The resulting time-varying signals are up-converted onto an RF frequency carrier, having frequency $f_{RF}$, using mixers 128, 130. The time-varying signal corresponding with the real components of the parallel-to-serial converter output is up-converted to produce an in-phase signal in mixer 128, while the time-varying signal corresponding with the imaginary components is up-converted to produce a quadrature signal in the mixer 130. The in-phase and quadrature components are combined in the summing element 132 to produce a total output time-varying electrical signal including the full information content of the input data 112.

In the exemplary embodiment of system 100, an additional constant offset is applied to the time-varying signal, in the form of bias input 134, to produce a time-varying signal suitable for use in modulating an optical carrier.

In the exemplary system 100, an optical transmitter 136 is arranged to apply the time-varying signal output from signal generator 118 to an optical source 138. The optical transmitter 136 includes the optical source 138, which is preferably a coherent optical source, for example a laser source such as a semiconductor laser diode. The time-varying signal generated by the signal generator 118 is used in the exemplary embodiment 100 to drive external modulator 140 of optical transmitter 136. External modulator 140 may be a Mach-Zehnder or electro-absorption type intensity modulator, an optical phase modulator, or the like. However, it will be appreciated that in alternative embodiments other means may be employed for modulating an optical source, such as, for example, an integrated laser modulator, or direct modulation of a suitable laser or other source. The performance characteristics of transmission using different types of modulator, different modulation formats, and a range of modulation depth are described below, with reference to FIG. 11.

Optical transmitter 136 also includes an optical filter 142, which is configured to at least substantially suppress one optical frequency sideband of the intensity modulated signal output from the optical modulator 140. The output of optical filter 142 thus includes substantially only a single information-bearing optical sideband in the optical frequency domain, corresponding with the time-varying signal output from signal generator 118, and used to drive optical modulator 140. The optical filter 142 may select only a single optical sideband, or may select a single optical sideband along with all, or a portion of, the optical carrier power.

In the exemplary system 100, the optical filter 142 allows substantially only a single optical sideband to pass, thereby suppressing the optical carrier in the output of the optical filter 142. Accordingly, an additional optical path 144 is provided along which a portion of the unmodulated output of the optical source 138 is transmitted, and recombined with the filtered optical sideband at the output of optical filter 142, to produce an optical signal which includes the optical carrier and substantially only a single information-bearing optical sideband.

Advantageously, the optical carrier power may be selected or adjusted in embodiments of the invention to achieve any desired division of total signal energy between the optical carrier and the sideband. This enables the optical signal output from transmitter 136 to be optimised for improved optical power efficiency and/or received signal quality. For example, a desired optical carrier level may be achieved by appropriate selection of splitting and/or combining components, or by including a suitable attenuator within the parallel optical path 144.

In still a further alternative embodiment, at least a portion of the optical carrier may be passed by the optical filter 142, in addition to providing a parallel optical path 144. Accordingly, when the unmodulated carrier is recombined with the signal at the output of the optical filter 138, the optical carrier level may be increased or decreased depending upon the phase relationship between the combined carrier waves. Such an arrangement may therefore be used to control or adjust the optical carrier power of the transmitted optical signal.

Further means and methods for achieving desired division of total signal energy between the optical carrier and the information bearing sideband will be apparent to those skilled in the art.

The optical signal is transmitted through fibre span 104 which consists of a series of optical amplifiers, eg 108, and fibre-transmission segments, eg 106. No compensation for dispersion of the optical fibre segments 106 is included within the fibre span 104, and accordingly the effects of dispersion accumulate along the entire length of the span.

The resulting signal, affected by dispersion, is received by receiving apparatus 110 which includes an optical detector 146, signal processing components 166 for generating a series of received data blocks from the time-varying electrical signal output from the detector 146, and an equaliser 168 for mitigating the effect of accumulated dispersion. The receiving apparatus 110 also includes demapping units 172 for recovering the originally transmitted digital information.

In the exemplary embodiment 100, the optical detector 146 includes a photodiode 148 and associated electronic circuitry 150, including amplifiers, filters and the like, for generating a received time-varying electrical signal having suitable characteristics for further processing by components 166.

Power splitter 152 divides the received time-varying signal into two separate processing paths, in which the in-phase and quadrature components of the transmitted signals are recovered and down-converted using RF mixers 154, 156 respectively. The resulting signals correspond with the real and imaginary components respectively of the complex-valued output of the frequency/time transform 120. These two signals are sampled and converted into corresponding sequences of digital values using analog-to-digital converters (ADCs) 158, 160. The serial-digitised samples are converted into parallel form in serial-to-parallel converter 162, and corresponding real and imaginary values recomposed into complex inputs to a time/frequency transformer 164.

In accordance with the exemplary embodiment 100, the time/frequency transformer 164 is a discrete Fourier transformer (DFT) preferably implemented using an FFT algorithm, which is the inverse transform corresponding with the IDFT implemented by frequency/time transformer 120.

The resulting frequency domain values are output in blocks from DFT 164. Each block includes a set of received data symbols corresponding with the transmitted data symbols input to the frequency/time transformer 120, subject to the effect of dispersion within the fibre span 104. An equaliser 168 including a bank of equalising filters, eg 170, is provided to mitigate the effect of dispersion upon the received data symbols, in order to recover the transmitted data symbols. In the simplest case, and indeed in the exemplary arrangement 100, each filter 170 is a complex multiplier which adjusts at least the phase of a corresponding received symbol value output from the DFT 164, in order to substantially equalise the effect of chromatic dispersion on the transmitted signal. It will be appreciated that such equalisation may additionally compensate for non-ideal frequency-dependent characteristics of the various electronic and opto-electronic components of the transmitting and receiving apparatus 102, 110. Depending upon such characteristics, and other characteristics of the fibre-transmission span 104, it may additionally be desirable that each filter 170 adjust the amplitude, as well as the phase, of the corresponding received symbol values. Adaptive equalisation may be employed in order to mitigate the effects of time-varying characteristics of the fibre span 104, and other transmission components, including PMD and some non-linear processes.

The resulting equalised symbol values are input to demapper 172, which includes individual demapping units 174, and which corresponds with the symbol mapper 114 included in the transmission apparatus 102. The demapping units 174 receive the equalised symbol values and generate corresponding bits of the digital information. The resulting decoded information is provided at parallel output 176. If the levels of noise and/or distortion within the system 100 are not excessively high, then the output digital information will generally match the original digital information bits provided at input 112. It will, of course, be appreciated by those skilled in the art that errors may be introduced due to noise and/or distortion in any communication system, and accordingly that a zero error rate in the transmitted information bit may not be achievable. However, it will also be understood that additional measures may be employed, including error detection and error correction codes inserted within the digital information, in order to detect and/or correct such bit errors.

The operation of exemplary system 100 has been verified through the use of computer simulations, the results of which are exemplified in FIGS. 2 to 10. A 10 Gb/s data rate was utilised in the simulations, with a block length of 1,024 bits. A 4-QAM symbol mapping was used in mapping and demapping blocks 114, 172 providing an overall symbol rate of 5 gigasymbols per second. An RF carrier frequency of $f_{RF}=7.5$ GHz was used, providing an OFDM information signal occupying a frequency band between 5 and 10 GHz from the optical carrier, which was set at 193.1 THz. The mean transmitted power was 1 milliwatt, and a loss compensated optical fibre transmission span 104 of 4,000 km in length was used, having a total dispersion of 64 ns/nm. As will be appreciated, this level of dispersion in a system operating at 10 Gb/s using a conventional baseband intensity modulation method would result in a received signal from which recovery of the transmitted digital information would be impossible without the use of suitable dispersion compensation methods in the optical domain prior to detection at the receiver.

Figure 2:
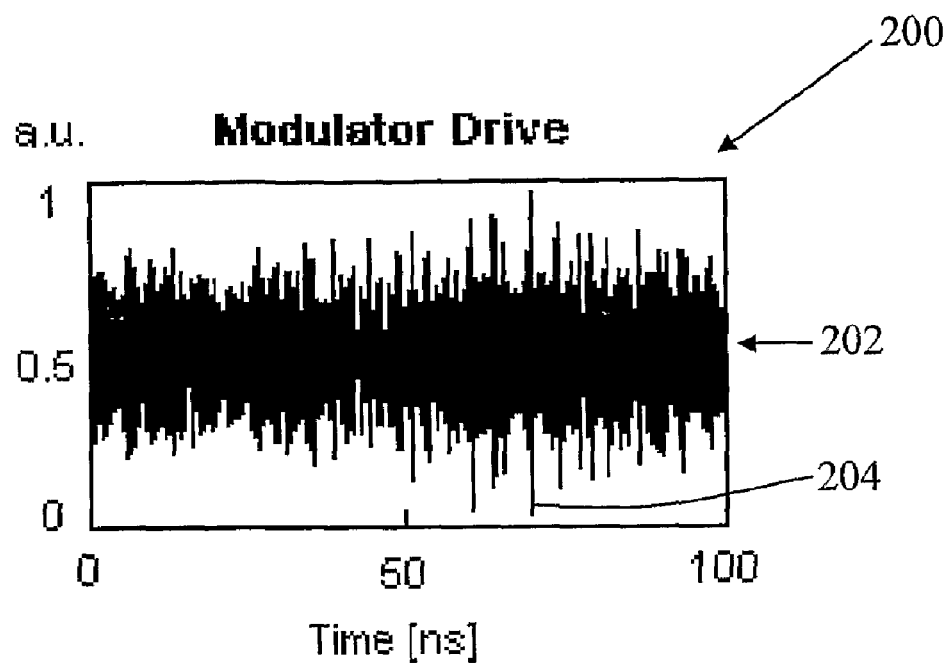
FIG. 2 shows an exemplary transmitter modulator drive waveform generated within the transmitter of the system shown in FIG. 1.
Figure 3:
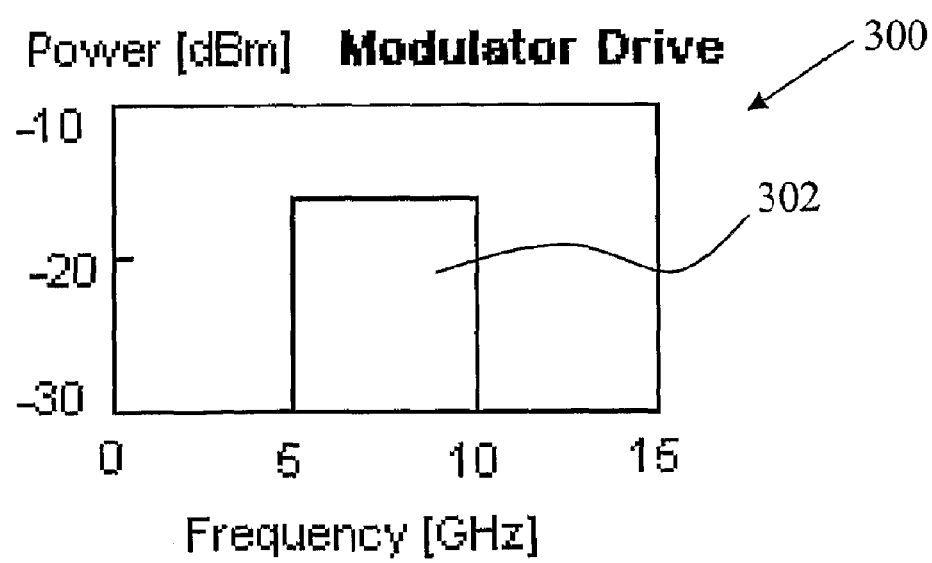
FIG. 3 shows an exemplary spectrum of the drive waveform of FIG. 2.

FIG. 2 shows an exemplary transmitter modulator drive waveform 200 generated at the output of signal generator 118. As a result of biasing 134, the drive waveform 200 has a positive mean signal level 202, established such that little or no clipping of peaks of the waveform, eg 204 occurs. FIG. 3 shows a corresponding electrical spectrum 300 of the drive waveform 200. As can be seen, in accordance with the OFDM modulation method employed in the signal generator 118, the spectrum 300 includes a clearly defined frequency band 302 occupying the range between 5 GHz and 10 GHz corresponding with the information signal to be transmitted.

Figure 4:
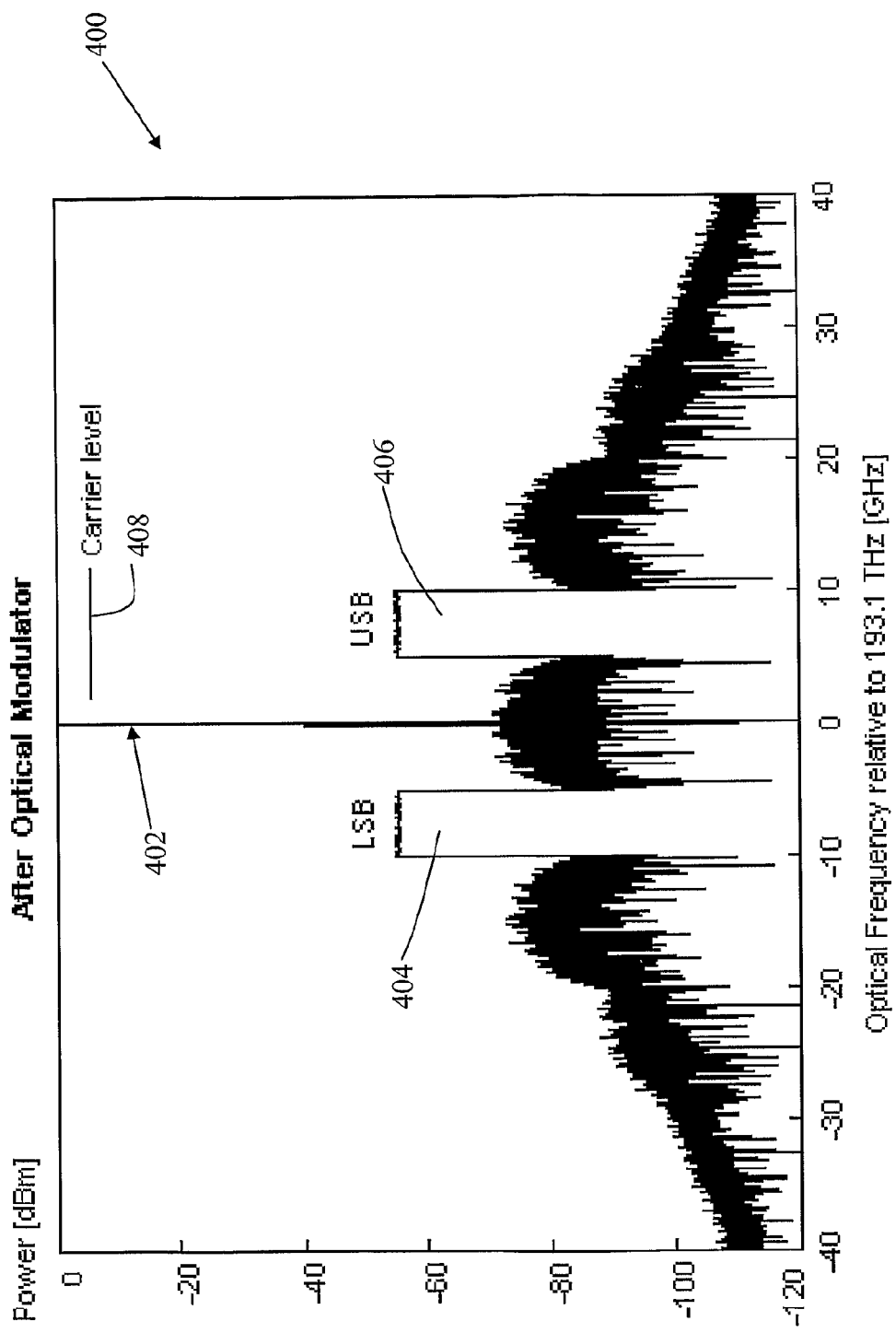
FIG. 4 shows and exemplary optical spectrum at the output of the optical modulator of the system shown in FIG. 1.

FIG. 4 shows a corresponding optical spectrum 400 generated at the output of optical modulator 140. The optical spectrum 400 includes an optical carrier signal 402 corresponding with the narrow linewidth output of laser source 138. Intensity modulation of the carrier has resulted in the production of a lower sideband 404 and upper sideband 406, corresponding with the modulator drive spectrum 300. As indicated in FIG. 4, the carrier level 408 is of significantly greater power than the information-bearing lower and upper sidebands 404, 406, corresponding with the relatively high bias level used to ensure minimal clipping of the transmitted signal waveform 200. As will be appreciated, this high carrier level corresponds with a low transmitted optical power efficiency. However, in accordance with preferred forms of the present invention, and as will be described in greater detail with reference to FIGS. 6 and 11, the transmitted carrier level may be reduced, in order to optimise, or at least to improve, the transmitted optical power efficiency and/or received signal quality of the system 100.

Figure 5:
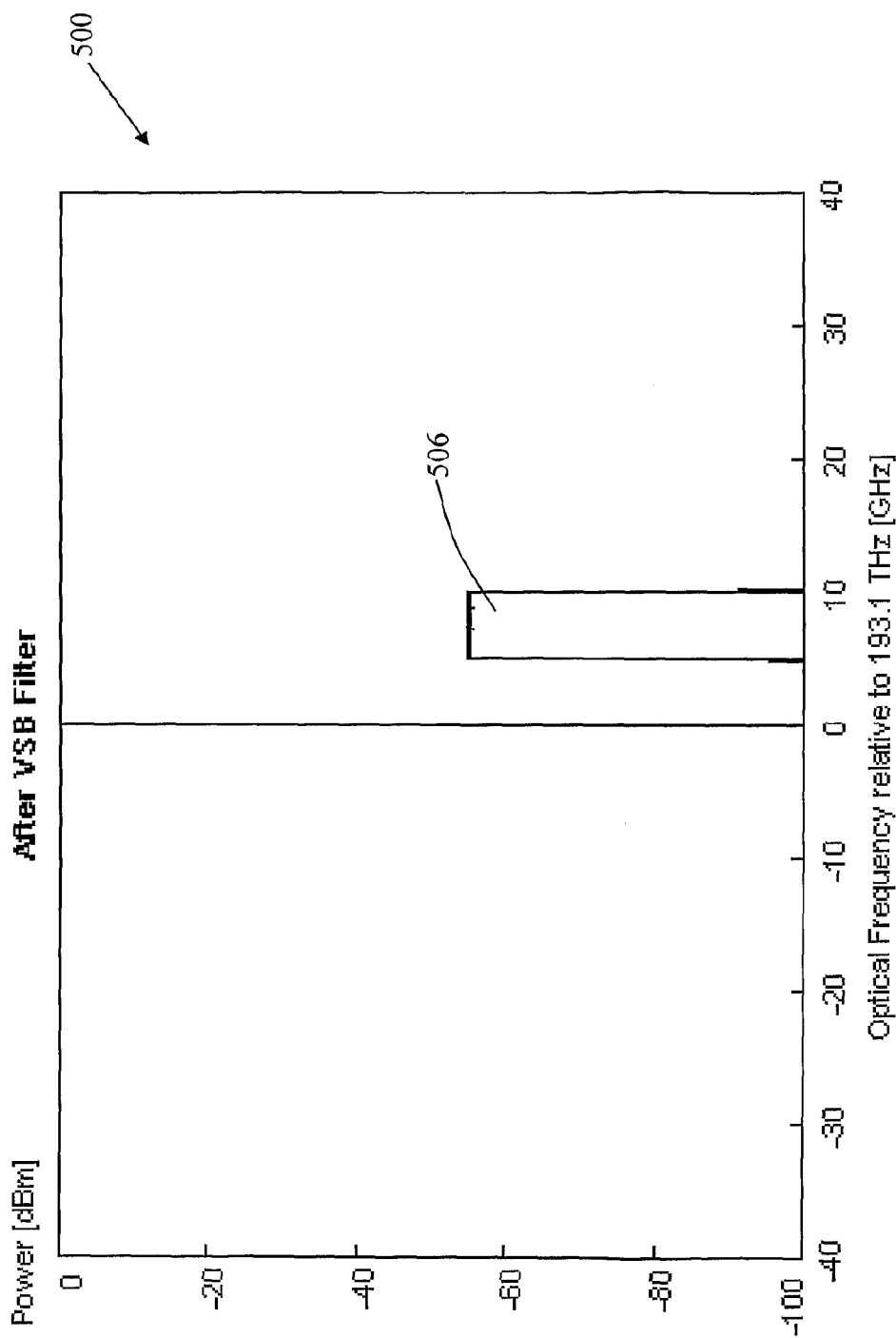
FIG. 5 shows an exemplary optical spectrum at the output of an optical sideband filter according to one particular embodiment of the system shown in FIG. 1.

FIG. 5 shows the optical spectrum 500 at the output of optical filter 142. As is apparent, the optical filter 142 has substantially suppressed the lower sideband 404 and the optical carrier 402, resulting in a spectrum including only a single information-bearing sideband 506.

Figure 6:
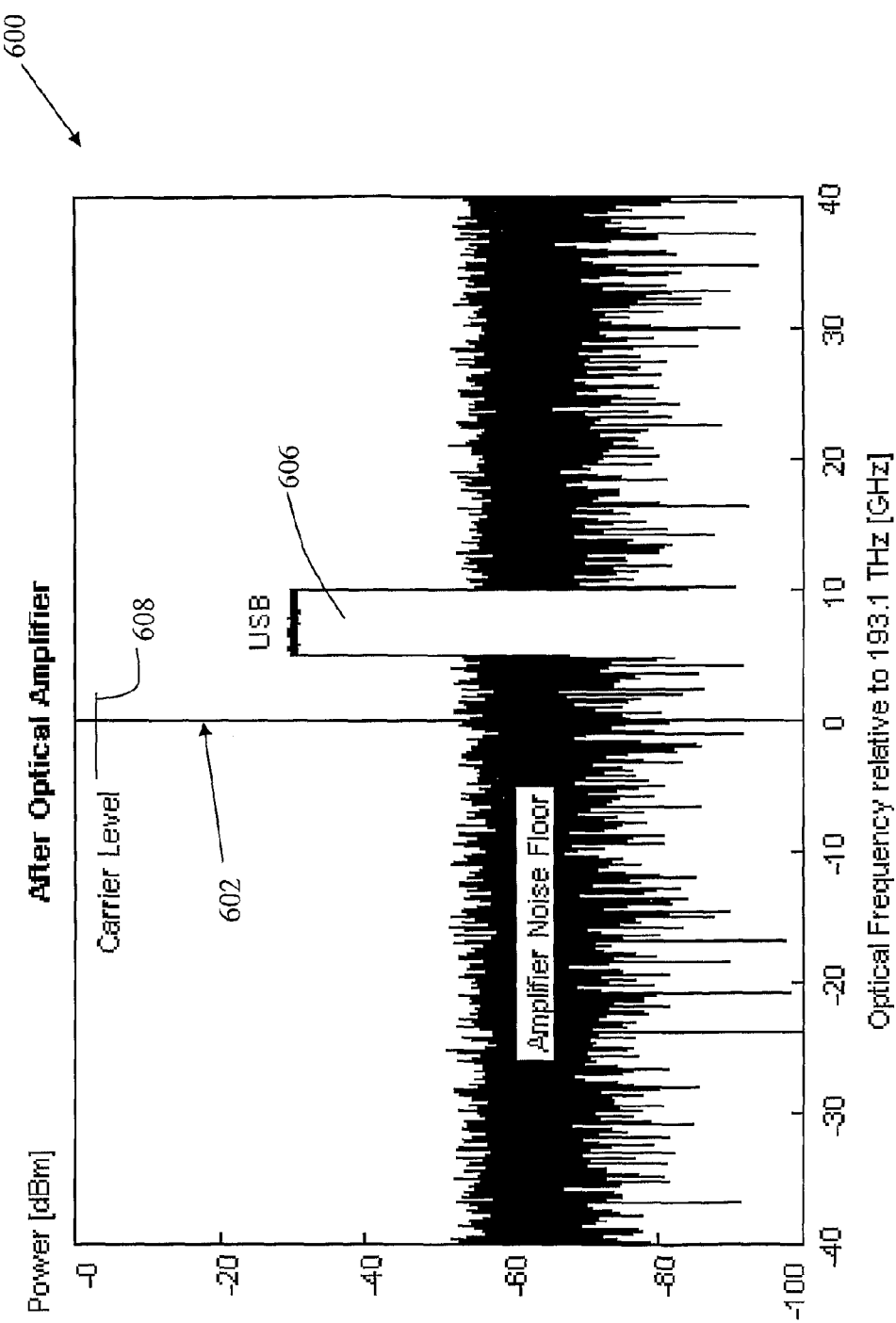
FIG. 6 shows an exemplary optical spectrum at the output of an optical amplifier within the single-mode fibre span of the system of FIG. 1.

FIG. 6 shows an exemplary optical spectrum at the output of an optical amplifier, eg 108, in the transmission span 104. A portion of the optical carrier generated by the laser 138 and directed along parallel path 144 within optical transmitter 136 has been combined with the output of filter 142, and accordingly the optical spectrum 600 includes an optical signal having an optical carrier 602 and substantially only a single information-bearing optical sideband 606. The level 608 of the recombined optical carrier 602 has been set such that the total power in the carrier is generally comparable with the total power within the information-bearing sideband 606. It has been found that appropriate adjustment of the carrier level 608 can result in an optimum, or at least significantly improved, optical power efficiency, and hence overall system performance. In the exemplary system simulations, an optimum system performance was obtained by attenuating the carrier by 25 dB before recombining with the modulated signal at the output of filter 142. The greatest improvements in performance may be achievable by approximately equalising the proportions of power in the optical carrier 602 and the information-bearing sideband 606, and, for example, reasonable performance may be achieved if the ratio between carrier energy and sideband energy is between 0.5 and 2.0. However, as described below with reference to FIG. 11, the optimum level of carrier attenuation may depend upon signal properties such as optical modulation format.

Figure 7:
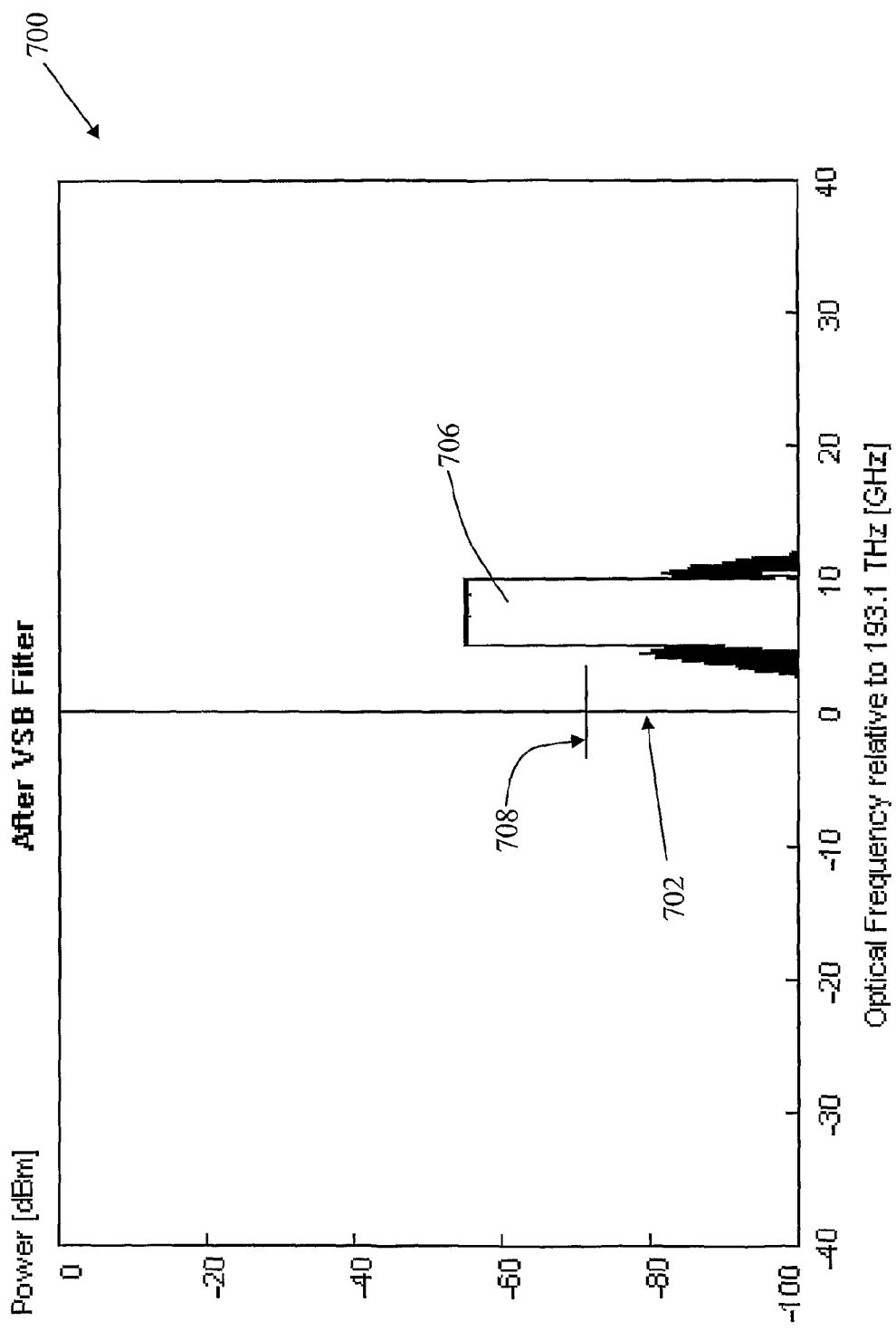
FIG. 7 shows an exemplary optical spectrum at the output of an alternative optical sideband filter of another embodiment of the system of FIG. 1.

FIG. 7 is an exemplary optical spectrum 700 illustrating the output of an alternative optical filter 142, which does not provide such complete suppression of the optical carrier 702 in selecting the desired optical sideband 706. Accordingly, a residual carrier level 708 is present in the output of this optical filter. A filter of this type, with suitable adjustment of passband characteristics, could be used, for example, as a vestigial sideband (VSB) filter for passing a single sideband, and sufficient optical carrier power that a recombination of a portion of the original optical source output may not be required. That is, by appropriate selection of the characteristics of filter 142, a transmitted optical signal may be generated which includes carrier power and signal power in appropriate proportions.

Figure 8:
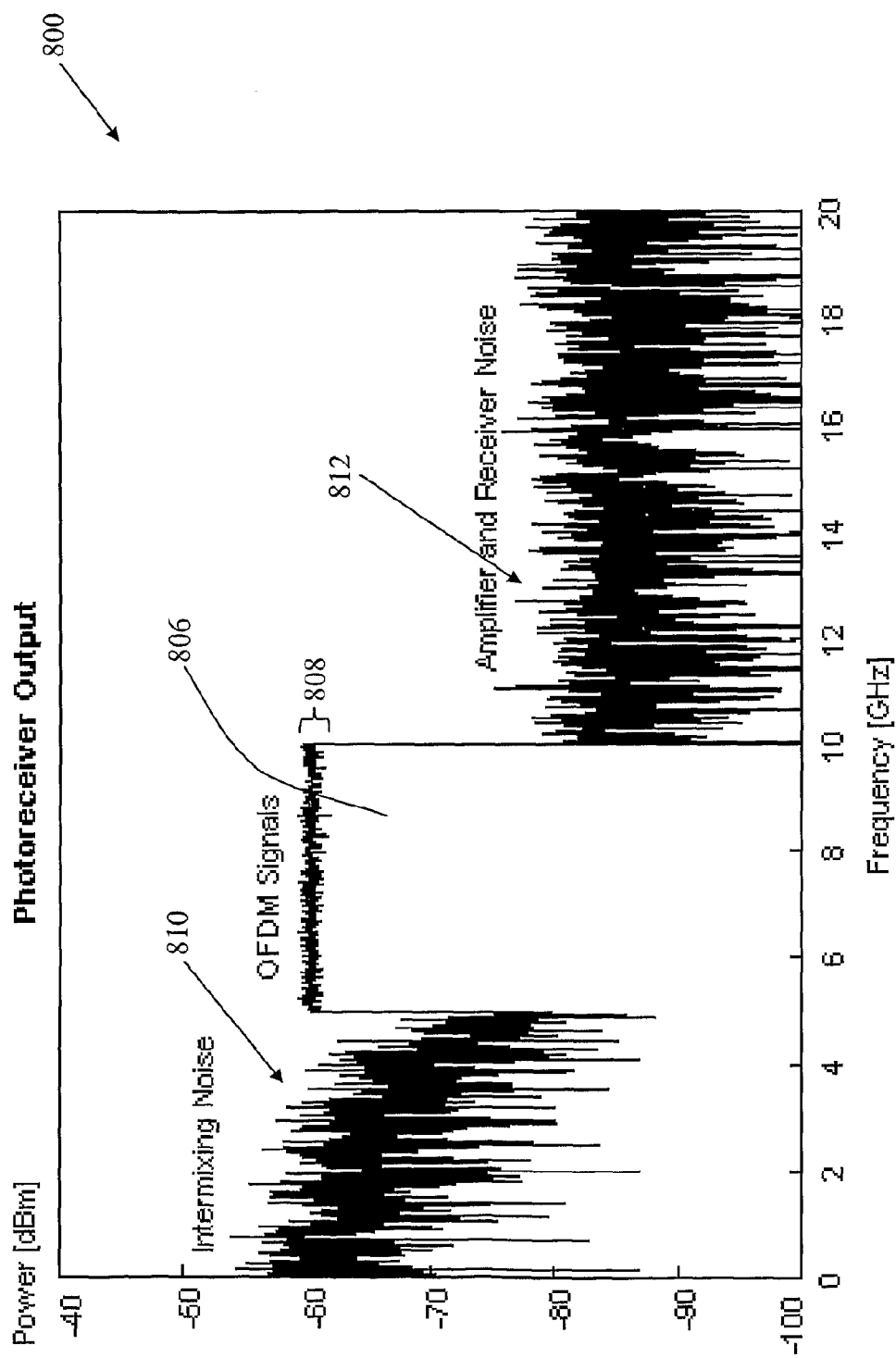
FIG. 8 shows an exemplary RF spectrum at the output of the photo-detector of the system shown in FIG. 1.

FIG. 8 shows an exemplary RF spectrum 800 at the output of optical detector 146. Features of the spectrum 800 include intermixing noise 810, the information bearing OFDM signal band 806 and system noise floor 812. By comparison by the RF spectrum 300 generated by the signal generator 118 within transmitting apparatus 102, a level of accumulated noise, due to optical and electrical noise sources, is apparent as fluctuations 808 in the spectral power of the received OFDM signals 806. However, it is apparent that the noise fluctuations are relatively small, by comparison with the mean signal level.

The intermixing noise 810 results from mixing of OFDM signal components at the photo-detector 148. The generation of such intermixing noise in the photo-detector 148 is a main reason that it is preferred to up-convert the OFDM signals onto a suitable RF carrier frequency. In particular, up-conversion of the information-bearing signals to provide a frequency guard band between DC and the signal band (in the RF domain) or equivalently between the optical carrier and the information-bearing optical sideband (in the optical domain) enables the effects of intermixing noise 810 to be substantially mitigated, or avoided altogether. In particular, if the frequency guard band width is equal to or greater than the bandwidth occupied by the information-bearing signals, then intermixing noise components resulting from generated difference frequencies between signal components will fall within the guard band at the optical detector 146, thereby substantially reducing their impact upon the quality of the received signal. For this reason, in the exemplary simulations the OFDM signals occupy an RF frequency band between 5 and 10 GHz, proving a low-frequency guard band between 0 and 5 GHz, within which the intermixing noise components 810 are generated at the optical detector 146.

A further advantage provided by the frequency guard band is that, in the exemplary system 100, the technical specifications of the optical filter 142 may be somewhat relaxed. Since the sideband to be suppressed is separated from the desired sideband by twice the guard bandwidth, it is possible to employ filters having a broader transition band than would be acceptable in the absence of the guard band.

It will be noted that in the exemplary system 100 illustrated in FIG. 1 a number of unused inputs 178 are provided at frequency/time transformer 120, and a corresponding number of unused outputs 180 are provided at time/frequency transformer 164. Preferably, zero symbols are provided at the unused inputs 178. As will be appreciated, the effect of these unused inputs and outputs is to provide for over-sampling within the digital signal processing. Such over-sampling is not necessary, but may be used for a variety of purposes, in order to perform various operations within the digital domain. In particular, an over-sampled system may enable the undesired intermixing noise products 810 and/or 812 to be "dumped" at the unused outputs 180 of time frequency transformer 164. Accordingly, the over-sampling is effectively used to provide filtering of these noise products in the digital domain, thereby relaxing the requirements upon filters provided in the electronic and/or optical domains. Indeed, it will be appreciated that in general many of the operations depicted in signal generator 118 and receiver signal processing components 166 may be performed in either the analog or digital domains, depending upon processing, component quality, cost and other requirements. Accordingly, the particular division of processing tasks between the digital and analog domains depicted in system 100 will be understood to be exemplary only, and the skilled person will appreciate that many variations are possible in this respect.

Figure 9:
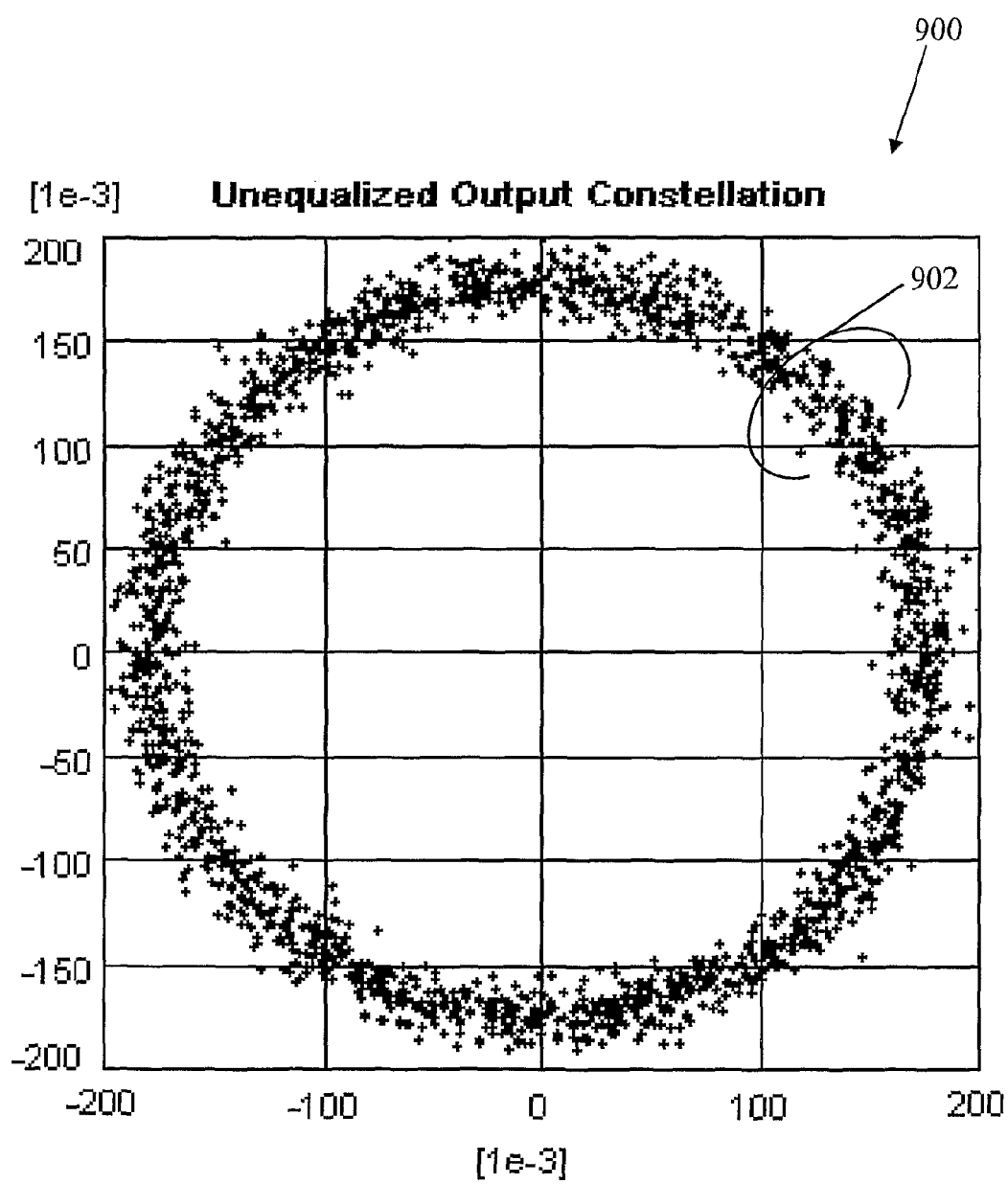
FIG. 9 shows an exemplary unequalised output constellation pattern generated within the receiver of the system shown in FIG. 1.

FIG. 9 shows an exemplary constellation pattern 900 of received data symbols appearing at the output of DFT 164 in the absence of equalisation. Points 902 of the constellation are distributed uniformly around a circle, clearly indicating the effect of chromatic dispersion of the fibre link 104 on the phase of the transmitted data symbols. The effect of amplitude noise, caused by optical and electronic components in the system 100, is also apparent in the constellation pattern 900. As a result of the phase shifts induced by chromatic dispersion, it is clearly impossible to recover the transmitted data symbols from the received data symbols making up the constellation pattern 900.

Figure 10:
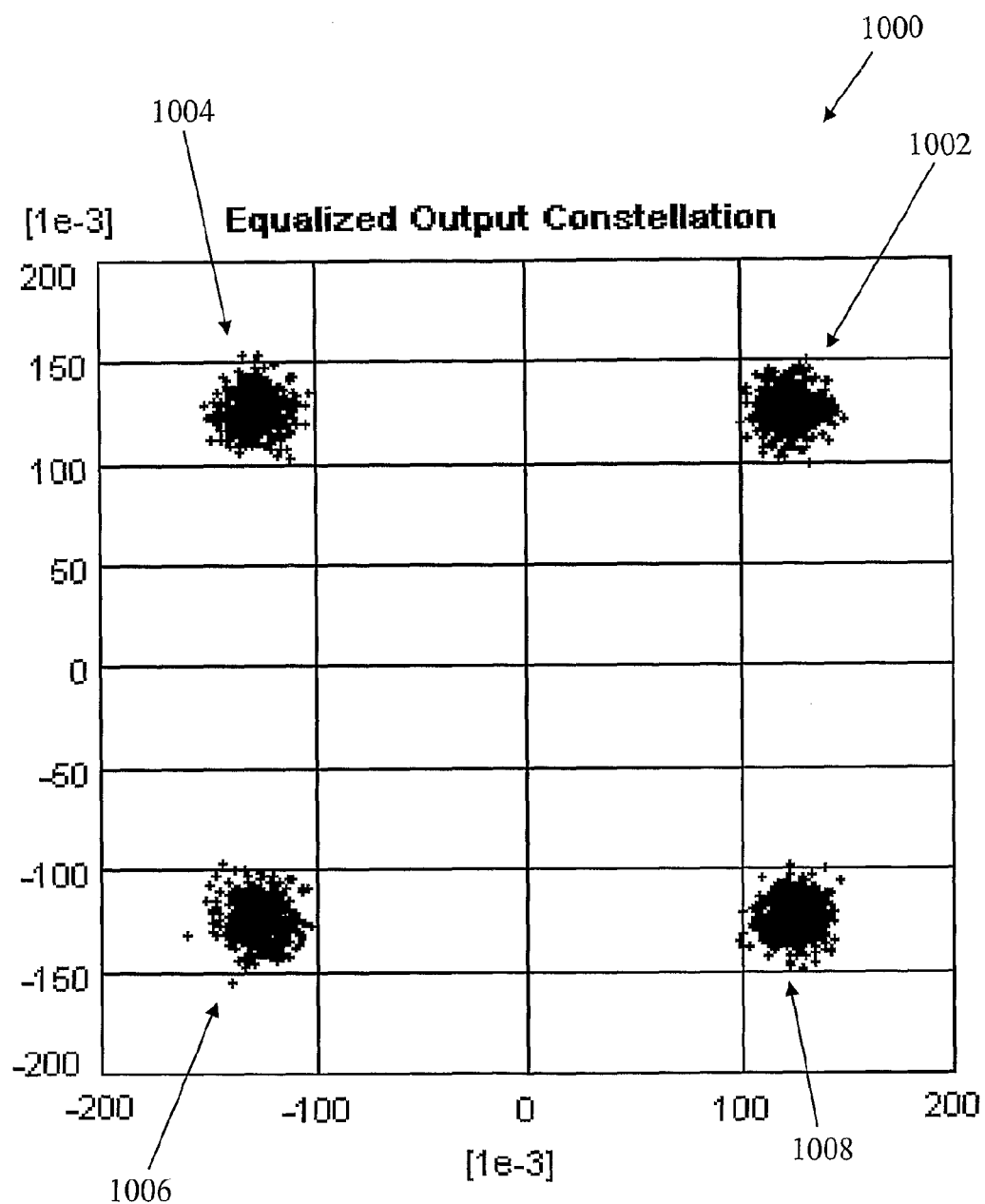
FIG. 10 shows an exemplary equalised output constellation pattern generated within the receiver of the system shown in FIG. 1.

The simulated system was trained using a single block of known data. Based upon the training data, the equaliser bank 168 was configured to apply to each received symbol the appropriate phase shift required to restore the original transmitted symbol value. Once the equaliser bank 168 had been configured in this manner, additional blocks of data were transmitted through the system 100, and the same equalisation applied within the receiving apparatus 110. FIG. 10 shows the resulting constellation pattern 1000, in which the four distinct constellation points 1002, 1004, 1006, 1008 are clearly distinguishable, indicating that recovery of the transmitted data symbols is now possible. It is accordingly apparent that the exemplary system 100 is able to substantially mitigate the effects of very large levels of chromatic dispersion entirely within the electronic domain, through the use of suitable signal processing in combination with the transmission of an optical signal including an optical carrier and substantially only a single information-bearing optical sideband in the optical frequency domain.

It is also noteworthy that the equalised constellation pattern 1000 appears to represent a signal having a relatively high signal-to-noise ratio (SNR), and that accordingly it should be practical in the exemplary system to employ a higher-order QAM mapping, such as, for example, 16-QAM, in order to achieve higher transmission capacity.

As has previously been mentioned, different optical modulation formats may be utilised for applying the time-varying signal output from signal generator 118 to optical source 138. For example, applicable modulation formats include intensity modulation and phase modulation. Furthermore, different types of external modulator 140 may be utilised corresponding with any selected modulation format. For example, intensity modulation may be applied using a Mach-Zehnder or electro-absorption type modulator, and with or without the application of linearisation techniques, as known in the art, to improve the linearity of modulation. Furthermore, the modulation depth is an additional parameter that may be varied in applying the time-varying signal output from the signal generator 118 to the optical source 138. The choice of modulation format, and modulation depth, amongst other parameters, may affect the transmission power efficiency and/or received signal quality.

Figure 11:
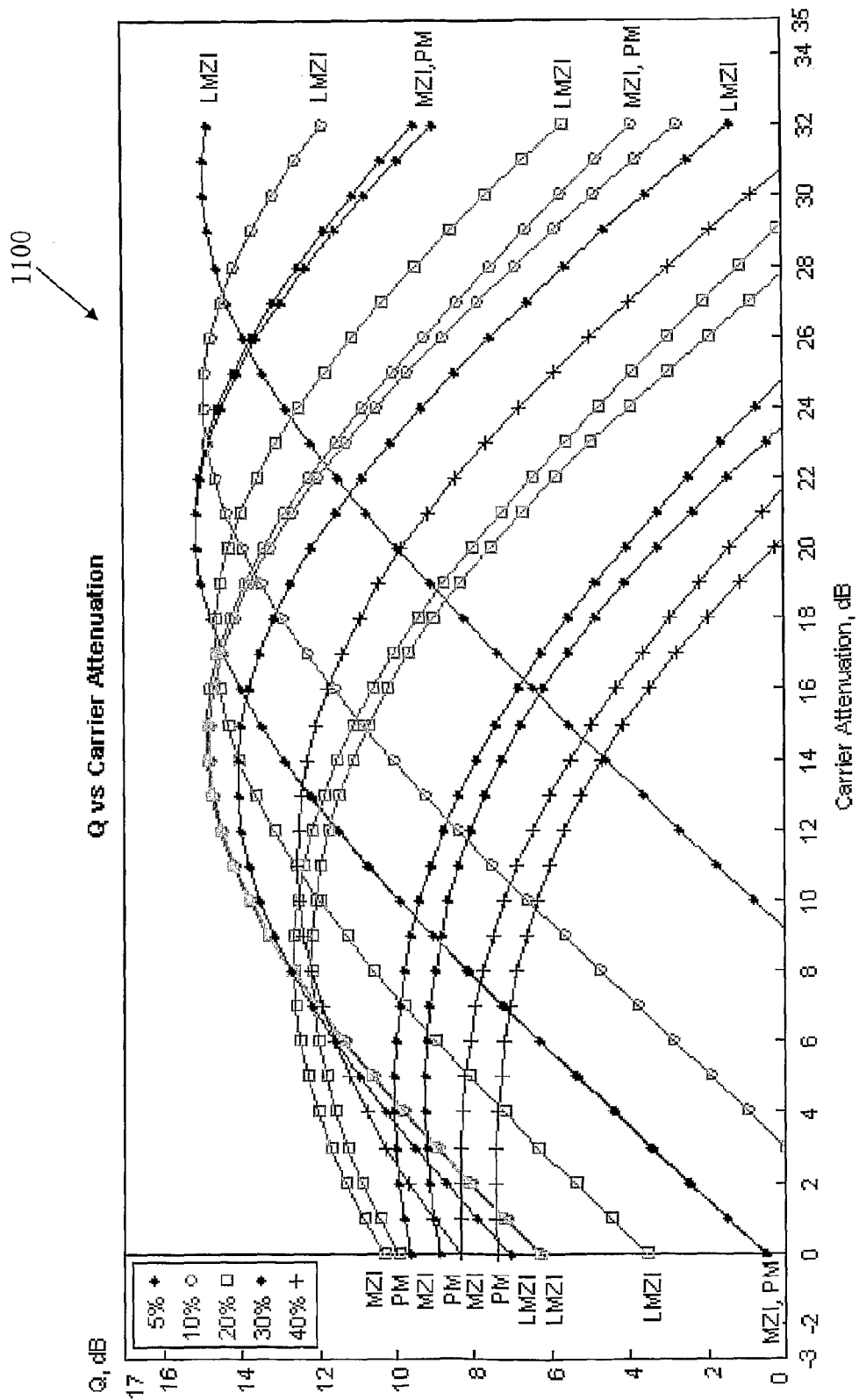
FIG. 11 is a graph of simulation results illustrating the optimisation of carrier attenuation for different modulation formats and modulation depths.

FIG. 11 shows a graph 1100 of simulation results which illustrates the manner in which a selected division of optical energy between the optical carrier and the information bearing optical sideband affects the signal quality. In particular, simulations have been conducted using three different types of modulator, and five different levels of modulation depth, with a variable attenuation applied to the optical carrier in each case in order to control the division of energy between the optical carrier and the information bearing optical sideband. Accordingly, each point on each of the curves in the graph 1100 corresponds to a single simulation run using a selected type of modulator, at a selected modulation depth, and a selected level of carrier attenuation. In each case, a Q value of the signal is calculated. In the simulations, a QAM mapping is utilised, and Q is defined in a conventional manner as the square of the mean distance of the sample values to the appropriate decision thresholds divided by the variance of the corresponding components of the QAM signal.

The simulations represented by the graph 1100 utilise intensity modulation and phase modulation. In the case of phase modulation, the phase modulator drive was constrained such that phase shifts having a magnitude exceeding 90 degrees were clipped. Two types of Mach-Zehnder intensity modulators were simulated, being a linearised Mach-Zehnder modulator and a Mach-Zehnder modulator without linearisation. In both cases, the drive to the Mach-Zehnder modulators was constrained between zero percent and 100 percent transmission. Accordingly, in all cases positive and negative peaks of the time-varying OFDM signal applied to the modulators undergo clipping at high modulation depth. In the various simulation runs, modulation depths of 5 percent, 10 percent, 20 percent, 30 percent and 40 percent were utilised.

Each curve in the graph 1100 is labelled to indicate the type of modulation employed, with PM indicating phase modulation, MZI indicating intensity modulation without linearisation, and LMZI indicating intensity modulation with linearisation. Symbols on the curves indicate the corresponding modulation depth, in accordance with the inset legend. The X-axis represents carrier attenuation in decibel units, whereas the Y-axis is the Q value, also expressed in decibel units.

As is clearly apparent from the curves in the graph 1100, for each combination of modulation format and modulation depth it is possible to obtain a maximum signal quality by selecting an appropriate level of carrier attenuation in order to provide a corresponding optimum division of optical energy between the optical carrier and the information bearing sideband of the transmitted optical signal. The optimum level of carrier attenuation corresponds with the local maximum of each curve. It is notable that, due to the inherently non-linear nature of all of the modulators simulated, and in particular the clipping applied by each in the case of high-amplitude inputs, generally better signal quality is achieved at lower modulation depth. It is also notable that a maximum Q value of around 15 dB, limited in the simulations by the optical signal-to-noise ratio (OSNR) resulting from amplifier noise in the transmission path, can be achieved using all of the simulated modulation formats. The linearised MZI modulator is able to maintain this maximum Q value at modulation depths of up to around 30 percent, thereby enabling a lower level of carrier attenuation to be employed for optimum results, whereby more efficient use may be made of the optical power output available from the optical source. By comparison, due to their higher degree of non-linearity, a lower maximum Q is available using either the (non-linearised) MZI modulator or the phase modulator at all modulation depths above around 10 percent. Notably, the performance of both the non-linearised MZI and the phase modulator is very similar in this respect. It should, however, be appreciated that a Mach-Zehnder intensity modulator inherently results in attenuation of the optical source power by at least 3 dB, whereas substantially lossless phase modulation is in principle possible. A 3 dB increase in modulated optical power at the transmitter results in a 6 dB increase in received electrical signal, in the absence of optical amplification. Furthermore, a phase modulator may be simpler to integrate into a laser transmitter than an MZI structure.

As will be apparent from the foregoing discussion, it is possible to employ various modulators, modulation formats and modulation depths in different embodiments of the present invention. Each of the exemplary modulation arrangements that have been trialled by simulation provides particular advantages and disadvantages, and an appropriate selection of modulator may be made based on the requirements of particular applications. Importantly, whichever modulation format is selected it is possible to optimise transmitted optical power efficiency and/or received signal quality by appropriate control or adjustment of the energy in the optical carrier and/or the information bearing optical sideband in order to achieve an optimal division of total energy in the optical signal therebetween.

It will be clear to those skilled in the art, from the foregoing description, that many variations of the present invention are possible, and that the invention is not to be limited to the particular embodiments described herein. Rather, the scope of the invention is defined by the claims appended hereto.

The claims defining the invention are as follows:

1. A method of communicating digital information over an optical channel comprising one or more spans of single-mode optical fiber, the method comprising:

prior to transmission of the digital information, configuring an equalizer with a frequency-dependent phase adjustment corresponding with at least one of chromatic dispersion and polarization mode dispersion experienced by an optical signal transmitted over the optical channel;

processing input digital information bits to generate a corresponding electrical orthogonal frequency division multiplexed (OFDM) signal comprising in phase and quadrature signal components, wherein the information bits are encoded in at least one block comprising a plurality of data symbols corresponding with frequency components of the electrical OFDM signal;

modulating an optical source with the in-phase and quadrature signal components of the electrical OFDM signal to produce a corresponding optical OFDM signal;

transmitting the optical OFDM signal over the optical channel;

detecting the optical OFDM signal to produce corresponding received in phase and quadrature signal components of the optical OFDM signal;

processing the received in-phase and quadrature signal components to recover the frequency components comprising the at least one block of the electrical OFDM signal; and the equalizer applying the configured frequency-dependent phase adjustment to equalize each frequency component in order to recover the transmitted data symbols and encoded information bits.

2. The method of claim 1 wherein the step of processing input digital information bits comprises generating the electrical OFDM signal by performing the steps of:

mapping information bits to said plurality of data symbols in accordance with a predetermined modulation format; and applying a frequency/time transformation to the data symbols to generate in-phase and quadrature electrical OFDM signal components.

3. The method of claim 2 wherein the predetermined modulation format is one of on-off keying (OOK), amplitude shift keying (ASK), quadrature amplitude modulation (QAM), phase-shift keying (PSK), and frequency shift keying (FSK).

4. The method of claim 2 wherein generating the electrical OFDM signal further includes a step of adding a guard time and/or a cyclic prefix to the in phase and quadrature signal components.

5. The method of claim 1 wherein the step of modulating the optical source is performed such that the optical OFDM signal includes an optical carrier component.

6. The method of claim 5 wherein the step of modulating the optical source is performed such that the optical OFDM signal includes substantially only a single optical sideband.

7. The method of claim 1 wherein the step of configuring the equalizer comprises transmitting over the optical channel a training block comprising predetermined data, and determining a frequency-dependent phase adjustment required by the equalizer to restore the transmitted predetermined data.

8. A method of receiving digital information via an optical channel comprising one or more spans of single-mode optical fiber, the received digital information being carried by an optical orthogonal frequency division multiplexed (OFDM) signal comprising an optical source modulated with in-phase and quadrature signal components of an electrical OFDM signal having digital information bits encoded in at least one block comprising a plurality of data symbols corresponding with frequency components thereof to produce optical in-phase and quadrature signal components, the method including the steps of:

prior to reception of the digital information, configuring an equalizer with a frequency-dependent phase adjustment corresponding with at least one of chromatic dispersion and polarization mode dispersion experienced by an optical signal transmitted over the optical channel;

detecting the optical OFDM signal to produce corresponding received optical in phase and quadrature signal components;

processing the received optical in-phase and quadrature signal components to recover the frequency components comprising the at least one block of the electrical OFDM signal; and the equalizer applying the configured frequency-dependent phase adjustment to equalize each frequency component in order to recover the transmitted data symbols and encoded information bits.

9. The method of claim 8 wherein the step of processing the received optical in phase and quadrature signal components comprises applying a time/frequency transformation to the received optical in-phase and quadrature signal components.

10. The method of claim 8 wherein the step of equalizing further includes applying an amplitude adjustment to one or more of said frequency components.

11. The method of claim 8 which comprises a step of recovering the encoded information bits by de-mapping the equalized data symbols in accordance with a predetermined modulation format.

12. The method of claim 11 wherein said predetermined modulation format comprises one of on-off keying (OOK), amplitude shift keying (ASK), quadrature amplitude modulation (QAM), phase-shift keying (PSK), and frequency shift keying (FSK).

13. The method of claim 8 wherein the step of configuring the equalizer comprises receiving via the optical channel a training block comprising predetermined data, and determining a frequency-dependent phase adjustment required by the equalizer to restore the transmitted predetermined data.

14. An apparatus for receiving digital information via an optical channel comprising one or more spans of single-mode optical fiber, the received digital information being carried by an optical orthogonal frequency division multiplexed (OFDM) signal comprising an optical source modulated with in-phase and quadrature signal components of an electrical OFDM signal having digital information bits encoded in at least one block comprising a plurality of data symbols corresponding with frequency components thereof, the apparatus comprising:

an optical receiver comprising a detector which detects the optical OFDM signal to produce corresponding received electrical in-phase and quadrature signal components; and an electronic processor which comprises an equalizer and which is configured to:

prior to reception of the digital information, configure the equalizer with a frequency-dependent phase adjustment corresponding with at least one of chromatic dispersion and polarization mode dispersion experienced by an optical signal transmitted over the optical channel;

process the received in-phase and quadrature signal components to recover the frequency components comprising the at least one block of the electrical OFDM signal; and apply the configured frequency-dependent phase adjustment in the equalizer to equalize each frequency component in order to recover the transmitted data symbols and encoded information bits.

15. The apparatus of claim 14 wherein the optical receiver comprises a demodulator configured to recover the in-phase and quadrature signal components of the received signal, and the electronic processor comprises at least two analogue-todigital converters (ADCs), the demodulator output being electrically-coupled to the ADC inputs, whereby the ADCs generate sequences of digital samples corresponding with the recovered in-phase and quadrature signal components.

16. The apparatus of claim 15 wherein the electronic processor further comprises a digital signal processor which is configured to:
   apply a time/frequency transformation to compute a plurality of frequency domain values corresponding with the frequency components comprising the at least one block of the OFDM signal; and
   equalize each frequency component by applying the configured frequency-dependent phase adjustment in the equalizer to corresponding ones of the frequency domain values in order to recover the transmitted data symbols and encoded information bits.

17. A system for transmitting digital information, comprising:
   a transmitter configured to generate an optical OFDM signal by modulating an optical source with in phase and quadrature signal components of a corresponding electrical OFDM signal wherein a plurality of digital information bits are encoded in at least one block comprising a plurality of data symbols corresponding with frequency components of the OFDM signal;
   a receiving apparatus according to claim 14; and
   an optical channel comprising one or more spans of single-mode optical fiber disposed to convey the optical signal from the transmitter to the receiving apparatus.

18. The apparatus of claim 14 wherein the electronic processor configures the equalizer by:
   receiving a training block comprising predetermined data transmitted over the optical channel; and
   determining a frequency-dependent phase adjustment required by the equalizer to restore the transmitted predetermined data.

* * * * *